March 21, 1967 J. W. PINKERTON 3,309,870
HYDROSTATIC TRANSMISSION
Filed July 6, 1965 3 Sheets-Sheet 1

INVENTOR:
John W. Pinkerton
BY
Hofgren, Wegner,
Allen, Stellman & McCord
Attys

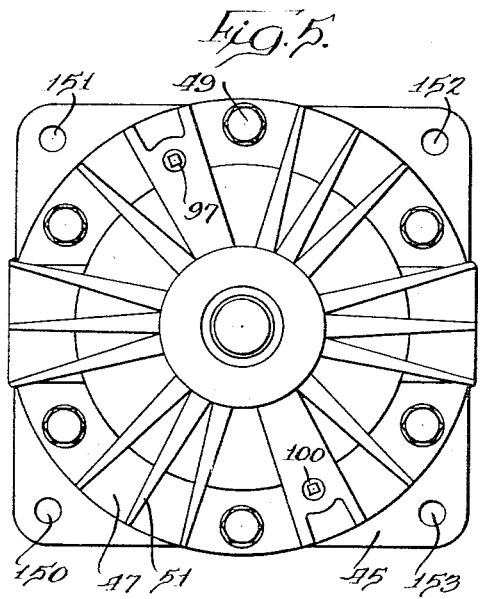
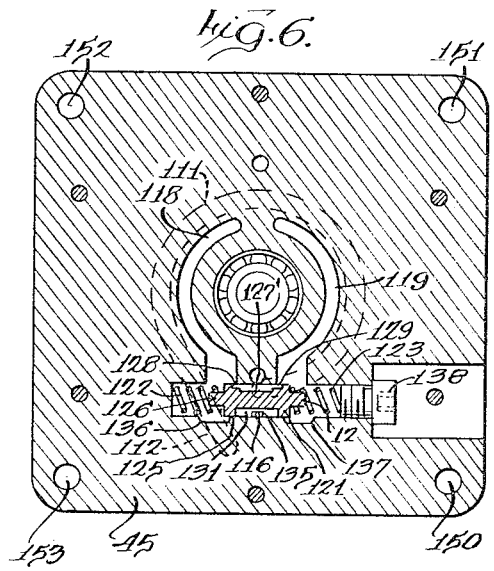
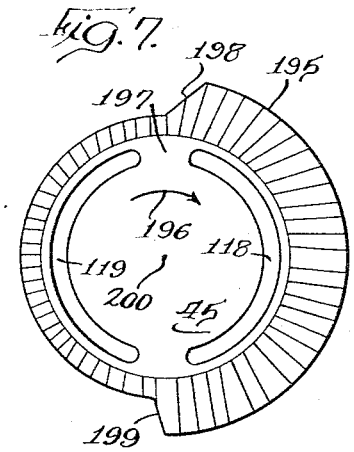
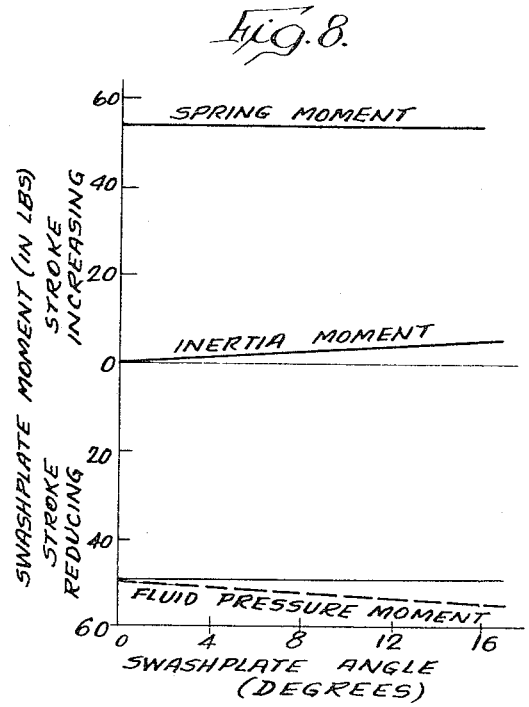

United States Patent Office 3,309,870
Patented Mar. 21, 1967

3,309,870
HYDROSTATIC TRANSMISSION
John W. Pinkerton, Rockford, Ill., assignor to Sundstrand Corporation, a corporation of Illinois
Filed July 6, 1965, Ser. No. 469,399
12 Claims. (Cl. 60—53)

The present invention relates to hydrostatic transmissions and more particularly to an industrial hydrostatic transmission assembly.

Hydrostatic transmissions of the type including multiple piston positive displacement hydraulic units have a multitude of industrial uses because of their high efficiency and their infinitely variable input to output speed ratios. In industrial applications it is oftentimes desirable to provide a separate electric motor for driving the transmission, a mechanical drive between the electric motor and the hydraulic transmission, a mechanical linkage for varying the drive ratio of the transmission, and sometimes a reservoir for supplying lubricating fluid to the transmission or supplying motive hydraulic fluid thereto. In the past one or more of these components have been installed separately at the installation site resulting in a space and labor consuming installation which is oftentimes unsuitable for installations where minimum space is available. Further, certain prior installations have resulted in service problems because of the difficulties in removing individual components from the assembly for repair and subsequent reinstallation.

It is, therefore, a primary object of the present invention to provide a new and improved industrial transmission assembly which may be readily installed in a limited space and in which the components thereof may be easily removed for repair.

A further object of the present invention is to provide a new and improved industrial transmission having a hydraulic transmission cartridge which is releasably mounted in a hollow base for easy removal. The hydraulic transmission cartridge may be easily removed subsequent to installation without disturbing the installation of the remaining components of the transmission assembly.

A more specific object of the present invention is to provide a new and improved transmission assembly having a hydraulic transmission cartridge consisting of an axial piston pump driven by an input shaft with a finned housing surrounding the pump and mounting a rotatable control linkage for varying the displacement of the pump, and further including an axial piston hydraulic motor driving an output shaft with an integral finned housing surrounding the motor, and with a valve plate fixed between the housings so that the pump and motor rotate about a common axis, with the valve plate having bearings for receiving and mounting the ends of the input and output shafts; a charge pump mounted within the valve plate for withdrawing fluid from the pump housing and supplying make-up fluid to the hydraulic circuit with valve means in association with the valve plate for selectively porting fluid from the charge pump to the hydraulic circuit, and also a reservoir fixed to the pump housing for supplying lubricating and make-up fluid thereto; the above described cartridge being one component separable from the remainder of the transmission for repair; a generally rectangular base surrounding and supporting the cartridge and having a bottom wall, side walls and a top wall connected together with a plurality of lugs extending inwardly from the walls and having mounting surfaces in a common plane, the valve plate having means thereon which releasably fix the entire cartridge to the base on the mounting surfaces whereby the cartridge may be inserted into the base as a unit; manual handle means inserted into the base for varying the angle of the cam member, normally rigid resilient spring means connecting the handle and the cam and adapted to yield when excessive pressure is produced by the pump; an electric motor fixed to the top wall of the base obviating the need for a separate motor installation, with the motor having a drive shaft rotatable about an axis parallel to the input and output shafts to minimize the size of the over-all transmission assembly; pulley and belt means interconnecting the drive shaft and the input shaft so that the electric motor drives the pump; and shroud means surrounding the pulley and belt and the reservoir to guard the rotating components.

Other objects and advantages of the present invention will become readily apparent from the following detailed description taken in connection with the accompanying drawings, in which:

FIG. 5 is a left end elevation of the hydraulic transmission cartridge of FIG. 3;

FIG. 6 is a cross section taken generally along line 6—6 in FIG. 3 showing the valve plate construction;

FIG. 7 is a pressure profile illustrating the effects of cross-over on the fluid pressure in the pumping cylinders; and FIG. 8 is a graph illustrating the moments on the variable swashplate in FIG. 3.

While an illustrative embodiment of the present invention is shown and described, it should be understood that the present disclosure is merely an exemplification of the principles of the invention and is not intended to limit the invention to the embodiment illustrated. The scope of the invention will be pointed out in the appended claims.

Figure 1:
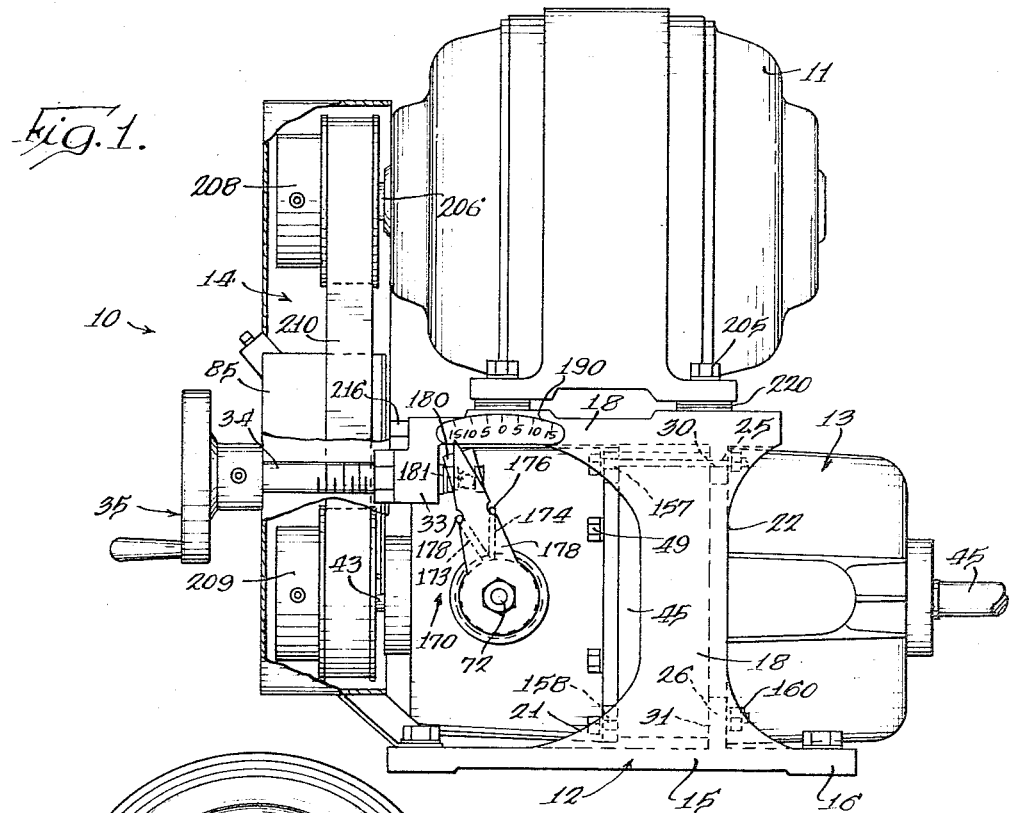
FIG. 1 is a front elevation of the transmission assembly with the shroud partially in cross section.

Referring in more detail to FIG. 1, a hydrostatic variable speed transmission assembly is generally designated by the numeral 10. The basic components of the transmission 10 are an electric motor 11, a generally rectangular hollow base 12, a hydrostatic transmission cartridge 13, and a pulley and belt drive 14. The cartridge 13 may be removed from the base 12 without disturbing the motor 11; and the motor 11 may be removed from the base 12 without disturbing the cartridge 13.

The base 12 is generally rectangular in shape and may be cast in one piece or fabricated by welding. Base 12 is defined by a generally horizontal bottom wall 15 having mounting pads 16 thereon adapted to be mounted on the floor or a suitable base at the installation site. Vertically extending side walls 18 and 19 are fixed to the bottom wall 15 and extend upwardly therefrom. A top wall 18' closes the base 12 and defines a generally rectangular hollow interior therein. The side walls 18 and 19 each have cut-out portions 21 and 22 to reduce the weight and cost of the assembly. Further, cut-out portion 21 permits easy removal of the cartridge 13 as will appear hereinafter. Four lugs 25, 26, 27 and 28 are integrally formed on the base 15 and extend into the hollow interior thereof from the junctures of the side walls 18 and 19 and the bottom and top walls 15 and 18'. The lugs 25–28 each define a mounting surface 30 and 31 for releasably engaging and supporting the hydraulic transmission cartridge 13. These four mounting surfaces lie in a common plane.

A cylindrical boss 33 is formed integrally with the base 12 and extends from one end thereof adjacent the cut-out portion 21. The boss 33 has a threaded aperture therein for receiving rod 34 in a displacement control handle assembly 35, described in more detail below.

Figure 3:
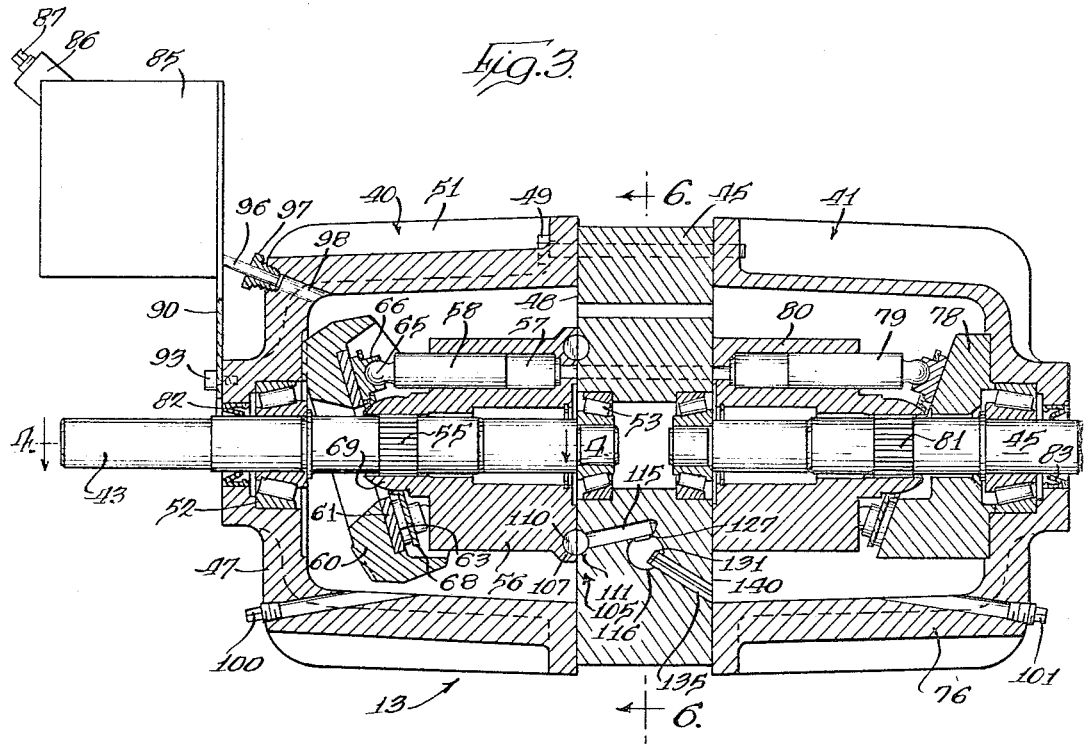
FIG. 3 is a longitudinal sectional view of the hydraulic transmission cartridge removed from the assembly of FIG. 1.

As noted above, the hydraulic transmission cartridge 13 fits as a unit within the hollow interior of the base 12. In FIG. 3 the cartridge 13 is seen to consist of an axial piston hydraulic unit 40, which as arranged acts as a pump, and an axial piston hydraulic unit 41 which acts as a motor. An input shaft 43 driven by the electric motor 11 through the pulley and belt assembly 14 drives the hydraulic pump 40 which delivers fluid to drive the hydraulic motor 41 and output shaft 45. Referring to FIGS. 3 and 6, a generally rectangular valve plate 45 is provided for transferring fluid between the hydraulic units and supporting the transmission cartridge 13 within the base 15. The hydraulic pump unit 40 includes a generally bell-shaped housing member 47 fastened to port face 48 of the valve plate 45 by suitable fasteners such as bolts 49. The housing member 47 may be integrally cast in one piece and as shown in FIG. 5, it has fins 51 integrally formed thereon. The fins 51 assist in removing heat from the transmission. The input shaft 43 is rotatably mounted in bearing 52 and 53 seated respectively in the housing member 47 and the valve plate 45. Splines 55 formed on the input shaft 43 engages and drive mating splines on pump cylinder block 56. The pump cylinder block 56 has a plurality of cylinders 57 therein which receive reciprocating pistons 58. A cam or swashplate member 60 is provided for reciprocating the pistons 58 in the cylinders 57 to deliver high pressure fluid through the valve plate 45 to the hydraulic pump 41.

The swashplate 60 has a face plate 61 slidably mounted in a counterbore therein defining a camming surface 63. The ends of the pistons 58 have spherical balls 65 universally mounted in spherical sockets in slipper units 66 which engage the camming surface 63. A resilient retaining ring 68 engages a spherical projection 69 on the left end of the cylinder block 56 and biases the slipper units 66 against the camming surface 63. The retainer ring 68 thus serves to return or withdraw the pistons 58 during the intake stroke and prevents the slipper units 66 from separating from the ring 61.

Figure 4:
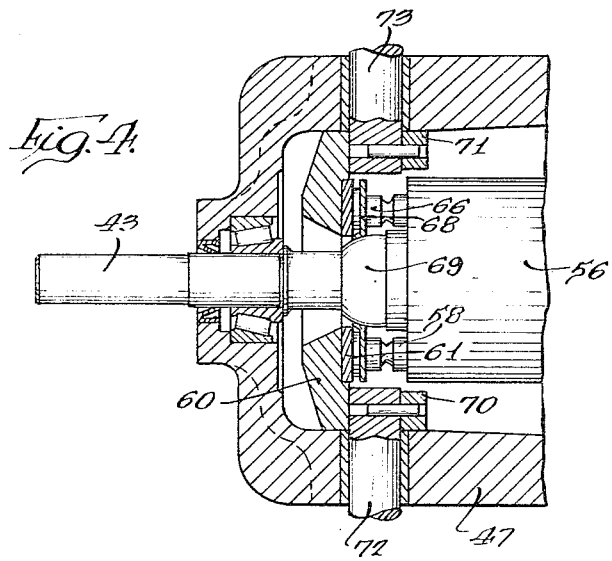
FIG. 4 is a fragmentary sectional view of one end of the hydraulic pump of FIG. 3 showing the swashplate mounting.

The swashplate 60 has yoke arms 70 and 71 formed therewith as shown in FIG. 4. The arms 70 and 71 are impaled by trunnions 72 and 73, respectively, mounted within the pump housing member 47 for pivotal movement about a horizontal axis. The displacement of hydraulic unit 40, and thus the speed ratio of the transmission, may be varied by varying the angle of the swashplate 60. Movement of the swashplate is effected by the control handle assembly 35 shown in FIG. 1 and the displacement control linkage described in more detail below.

The hydraulic unit or motor 41 is of the axial piston, positive displacement type and is similar in construction to the hydraulic pump 40 except that the displacement thereof is fixed. A housing member 76 is provided for the hydraulic unit 41 and is similar in construction to the pump housing member 47 except that it has no trunnion mountings. A cam member 78 is fixed in housing 76 by suitable means and defines a camming surface for reciprocating pistons 79 in motor cylinder block 80. Fluid delivered from the hydraulic pump 40 through the valve plate 45 drives pistons 79 to the right rotating the cylinder block 80 and driving the output shaft 45 through splines 81 formed thereon which engage mating splines on the motor cylinder block 80.

Suitable seals 82 and 83 are provided for the input shaft and the output shaft respectively to prevent fluid leakage along the shafts.

Figure 2:
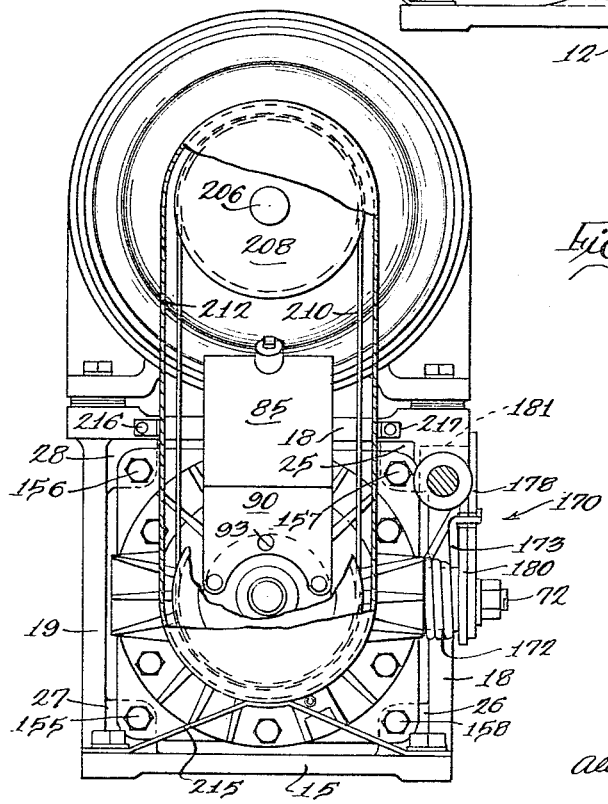
FIG. 2 is a left side elevation of the transmission assembly with the shroud and control handle partially in cross section.

Referring to FIGS. 1–3, a rectangular tank reservoir 85 is provided for maintaining the desired lubricating and make-up oil level within the pump housing 47. A boss 86 fixed to the reservoir 85 has a fill cap 87 therein through which hydraulic fluid may be added to the reservoir as needed. The reservoir 85 is attached to the pump housing member by a vertically extending plate 90 fixed to the reservoir 85 and fixed to the left end of the housing member 47 by studs 93. Fluid flows from the reservoir 85 to the interior of the pump housing 47 through conduit 96 connected to a fitting 97 threaded in a pump housing 47 and communicating with the interior of the housing through passage 98. Suitable drain conduits and plugs 100 and 101 are provided for the pump housing 47 and the motor housing 76 respectively.

A charge and make-up pump generally designated by the numeral 105 in FIG. 3 is provided for withdrawing fluid from the interior of the pump housing 47 and delivering fluid to the hydraulic circuit connecting the pump 40 and the motor 41 for making up losses due to leakage and also for displacing heated fluid in the circuit with cool fluid from the housing 47. A semi-toroidal peripheral groove 107 (half circular in cross section) is formed in the end face of the cylinder block 56 adjacent the port plate. Equally spaced impeller blades 110 extend transversely across the semi-toroidal groove 107 and form discrete buckets in the face of the cylinder block 56. It should be understood that the semi-toroidal groove 107 and the struts 110 may be cast or machined directly on the face of the cylinder block 56, thereby providing an integral structure. Referring to FIGS. 3 and 6, the semi-toroidal groove 107 mates with a semi-toroidal passage 111 of similar cross section on the face 48 of the valve plate 45. Semi-toroidal passage 111 extends through an arc of approximately 270 degrees and has a tangential portion 112 which terminates in an inlet passage opening to the interior of the pump housing 47. The inlet passage extends outside the periphery of the cylinder block 22. At the opposite end of the semi-toroidal passage 111, a make-up fluid passage 115 communicates therewith and extends into a valve bore 116 formed within the valve plate 45. A generally similar charge pump is disclosed in more detail and claimed in the copending application of Donald B. Reinke, Ser. No. 338,117, filed Jan. 16, 1964, and assigned to the assignee of this application.

As the cylinder block 56 rotates, charge pump 105 draws fluid in through the inlet passage from the pump housing 47, compresses the fluid which flows spirally in the toroidal passage, and expels fluid into the make-up passage 115 and into bore 116.

Referring now to FIG. 6, wherein the valve plate 45 is shown in cross section, arcuate ports 118 and 119 are formed therethrough symmetrically about the axis of rotation of the hydraulic units 40 and 41. Ports 118 and 119 provide a closed circuit conduit between the hydraulic pump 40 and the hydraulic motor 41 so that fluid is delivered under high pressure from the pump 40 to the motor 41 and returned from the motor 41 to the pump 40 under low pressure. Either of the conduits 118 or 119 may be the high pressure port depending upon the position of the swashplate 60.

A shuttle valve, generally designated by the numeral 121, is provided and has two primary functions: (1) it permits the flow of supercharged fluid from the auxiliary pump to the low pressure side of the system; (2) it removes hot excess oil from the low pressure side and discharges it into the interior of the pump housing 76. When no external force is exerted upon shuttle valve member 121, springs 122 and 123 urge the valve to its central position in bore 116. Valve member 121 consists of a central cylindrical portion 125 slidable in bore 116 with reduced projections 126 and 127 extending from the ends thereof which receive springs 122 and 123, respectively.

Viewing FIGS. 3 and 6, a slot or groove 127 of rectangular cross section is formed in the upper surface of cylindrical portion 125 and has reduced extensions 128 and 129 at opposite ends thereof. On the lower surface of the cylindrical portion 125, another rectangular slot or groove 131 is formed. A plug 138 is threaded in the right end of the bore 116 to prevent fluid from leaking therefrom and to permit assembly of the valve. Pockets 136 and 137 are formed in the lower portion of bore 116 to permit the flow of overheated oil from the system. A hot oil tube 135 projects into the groove 131 thereby preventing rotation thereof, as seen in FIG. 3, and extends to port face 140 of the valve plate 45, opening into the interior of motor housing 76 whereby overheated oil may flow therethrough into the housing. A generally similar shuttle valve is described in more detail and claimed in U.S. Patent 3,177,665.

The operation of the auxiliary charge pump and hot oil discharge components are as follows. As the pump cylinder block rotates, the auxiliary charge pump 107 draws fluid from the interior of the pump housing 47 through inlet passage 112 to the toroidal passage 107, 111. The blades 110 carry the fluid around the passage, while centrifugal force carries the fluid radially outward, thereby compressing the same. The impelling and centrifugal forces produce a spiral flow of the fluid as it travels around the toroidal passage. Compressed fluid is expelled through the make-up outlet passage to the interior of groove 127. If port 119 is the high pressure port, the shuttle valve 121 will be forced to the left due to the differential pressure on the valve. Slot 128 and recess 131 thereby communicate with port 118 which is then the low pressure port, i.e., the port returning fluid from the motor 41 to the pump 40. Make-up fluid from the charge pump 107 is thereby delivered to the low pressure port 118, and from there to the pump inlet. The feeding of supercharged fluid to the low pressure port 118 continues so long as the pump remains in operation and so long as the swashplate is not reversed. If the swashplate is reversed, the spool valve 121 moves to its right-hand extreme position and supercharged fluid is admitted through recess 129 into port 118 which then would be the low pressure passage.

Assuming the shuttle valve 121 to be in its left extreme position, hot oil is discharged from the low pressure port 118, through pocket 136, into groove 131, through the hot oil tube 135, and into the motor housing 76.

Referring to FIG. 5, it may be seen that the pump housing 47 is generally cylindrical in shape while the valve plate 45 is rectangular and therefore the corners of the valve plate extend from the general contour of the hydraulic transmission cartridge 13. Bores 150–153 are formed in these corner portions. Bores 150–153 are adapted to receive bolts 155–158 which extend therethrough and through the lugs 25–28. The bolts threadedly receive nuts 160 which draw the valve plate against the mounting surfaces 30 and 31, thereby releasably fixing the fluid transmission cartridge 13 to the base 15. The cartridge 13 may be easily removed from the base 15 by merely unscrewing nuts 160 and pulling the cartridge 13 to the left, as shown in FIG. 1, after disconnecting the pulley and belt 14 and the control handle 35.

Referring again to FIG. 1, the control handle assembly 35 and control linkage 170 are provided for varying the displacement of the axial piston pump 40 and also for limiting the maximum pressure delivered by the pump 40 to the motor 41. The control linkage 170 extends outside of the housing member 47, as shown in more detail in FIG. 2. The cut-out portion 21 in the side wall 18 permits the cartridge 13 to be inserted into the base 15 from the left, as shown in FIG. 1, without the control linkage 170 interfering with the base 15. After insertion, the control linkage is attached to the rod 34. The control linkage 170 serves a pressure-limiting function by permitting the swashplate 60, shown near its maximum displacement position in FIGS. 1 and 3, to rotate towards its zero displacement position, i.e., its vertical position, when the pressure in the high pressure port in valve plate 45 exceeds some predetermined value. The pressure-limiting means, a coiled torsion spring 172, is positioned on an extension of trunnion 72 outside of the pump housing 47. The coil spring 172 has spring arms 173 and 174 which cross and are engaged in grooves 175 and 176, respectively, in the sides of a pointer 178 fixed to the trunnion 72. The spring arms 73 and 74 also flank a lever 180 which is freely rotatable on the trunnion 72 so that spring 172 normally assures that the pointer and the lever move together. The link 180 has a U-shaped channel portion at its upper end which flanks the right-hand necked-down portion of control rod 34. Pins 181 fixed to the opposite sides of the channel portion of link 180 ride in the necked down portion of the rod 34, so that the control rod 34 may be rotated and thereby threaded to the right or to the left, as viewed in FIG. 1, and the control link 180 will rotate about the trunnion 72. A scale 190 is provided which in conjunction with the pointer 178 indicates the actual angle of swashplate 60.

An excessive fluid pressure moment on the swashplate 60 through the pistons 58 will cause the trunnion 72 and the pointer 178 to rotate in a stroke-reducing direction overcoming the force of the spring 172 permitting the pointer 178 to move away from the link 180 and its initially adjusted position. The initial position is set by control handle 35. It should be noted that swashplate 60 is reversible and that spring 172 permits the swashplate to yield toward the neutral position from an initially preset position on either side of neutral. In this manner, the resilient control linkage is reversible in the sense it permits the swashplate to move in a stroke-decreasing direction when excessive pressure is produced in the hydraulic circuit regardless of which port in the valve plate is the high pressure port.

The spring 172 will, at all adjusted positions of the swashplate, just balance the other moments acting on the swashplate about the trunnion 72 when the pump is pumping at maximum pressure, so that any increase in pressure above the maximum will rotate the swashplate in a stroke-decreasing direction, thereby reducing the displacement of the pump and reducing the pressure of the fluid delivered. For a complete understanding of how spring 172 is designed to accomplish this function, it is necessary to understand the moments acting on the swashplate about the trunnion 72 during rotation of the cylinder block 56. There are two major forces acting on the swashplate 60 during rotation of the cylinder block 56, and these will be described with respect to FIGS. 3 and 7. Referring to FIG. 3, during the pumping stroke of the pistons, as the pistons approach the top dead center position, slippers 66 rapidly decelerate the pistons 58. This causes a force acting on the swashplate 60 along a line extending through the center of the piston in the top dead center position due to the inertia force of the piston decelerating. This inertia force causes a moment acting on the swashplate 60 about trunnion 72 which tends to increase the stroke of the swashplate 60 and urge it toward its maximum stroke position.

Referring to FIG. 7, a pressure graph 195 is developed about the valve plate 45 and indicates the pressure within the cylinders 57 as the cylinder block rotates in the direction of arrow 196. It has been found that as the cylinders pass over the top dead center position on the crossover 197 and begin moving into the cylinder toward the port plate that the pressure in the cylinder does not immediately reach maximum value because of the slight compressibility of hydraulic fluid and also because of the crossover 197 itself. This produces a gradual rise in the cylinder pressure, as indicated at 198, on the pressure curve 195. A somewhat similar curve results on the crossover between the high pressure port 118 and the low pressure port 119. As indicated at 199, the pressure in the cylinders as the cylinders pass bottom dead center does not immediately decrease to the inlet pressure but does so relatively gradually, though the pressure drop occurs more quickly than the pressure increase shown at 198. Because the net fluid pressure forces in the pistons are greater below axis 200 than above the axis, as indicated by the graph of FIG. 7, the fluid pressure exerts a net fluid pressure moment on the swashplate 60 which acts in a stroke-reducing direction. A more detailed discussion of these forces is contained in a Hann et al. application Serial No. 113,697, filed May 31, 1961, now U.S. Patent No. 3,230,-893, and in Moon application Serial No. 379,968 filed July 2, 1964 abandoned in favor of continuation-in-part application Serial No. 461,356, filed June 4, 1965.

These two moments described above are plotted on the graph of FIG. 8 for various swashplate angles. The fluid pressure moment is stroke-reducing, as noted above, and increases slightly as the swashplate angle increases. This increase is due to a slower pressure rise as shown at 193, when a greater volume of fluid is compressed and delivered by the pistons. The inertia moment, discussed above, is zero at zero swashplate angle because the pistons are not reciprocating, and is a maximum at the maximum swashplate angle as the pistons travel fastest at this time. It should be noted that the graph in FIG. 8 is drawn for a constant pump speed.

Pistons 58 are constructed of a lighter metal than conventionally employed in order to reduce the inertia moment at the maximum displacement position of swashplate 60 so that the maximum inertia moment approximately equals the change in fluid pressure moment from zero displacement to maximum displacement, each being shown as approximately five inch pounds in FIG. 8. The spring rate in spring 172 is substantially constant for all swashplate angles, and in the example shown in FIG. 8 is approximately fifty-three inch pounds. In this way the stroke-increasing inertia moment cancels the increase in the fluid pressure moment from zero to maximum displacement and the substantially constant spring moment balances the resulting fluid pressure moment. Therefore, if the pressure in one of the pressure passages 118 or 119 increases above the maximum fluid pressure for which the spring 172 is designed, the swashplate 60 will rotate in a stroke-reducing direction and thereby reduce the flow delivered by the pump and reduce the pressure in the outlet port.

Referring again to FIGS. 1 and 2, the electric motor 11 is fixed to the top wall 13 of the base 12 by suitable bolts 205. The motor 11 has a drive shaft 206 which extends beyond the left side of the base 12 and rotates about an axis parallel to the input shaft 43. Pulleys 208 and 209 are fixed to the motor shaft 206 and the input shaft 43, respectively. A belt 210 surrounds these pulleys and transmits driving torque from the motor 11 to the pump 40. The reservoir 85 is located inside the belt 210 to minimize the size of the over-all assembly. A shroud 212 surrounds and guards the pulley and belt drive. Shroud 212 is supported at its lower end by a bracket 215 welded to the shroud and fixed by suitable bolts to the base 12. Further, L-shaped brackets 216 and 217 assist in supporting the shroud and are fixed to the left end of the top wall 18 and extend horizontally therefrom, being welded adjacent their distal ends to the sides of the shroud 212, as best shown in FIG. 2.

The correct tension may be placed on belt 210 by selecting the proper number of shims 220 between the top wall 18 of the base and the motor 11.

I claim:

1. A hydrostatic transmission assembly, comprising: a hydraulic transmission cartridge including a first axial piston hydraulic unit adapted to receive and deliver fluid, a second axial piston hydraulic unit adapted to receive and deliver fluid, each of said hydraulic units including a rotatable cylinder block, cam means for reciprocating pistons therein and a housing surrounding the block and cam means, and a valve plate having ports therein communicating with said first and second hydraulic units, said cylinder blocks both slidably engaging said valve plate, said first and second hydraulic units being in back-to-back relation, having a common axis of rotation and being fixed together with said valve plate as a unit; a base member surrounding and supporting said cartridge, said base member being constructed to permit the insertion of said cartridge as a unit without the disassembly of the cartridge or base member, and means for releasably attaching said cartridge to said base member whereby the cartridge may be inserted as a unit in the base.

2. A hydrostatic transmission assembly, comprising: a hydraulic transmission cartridge including a first axial piston hydraulic unit adapted to receive and deliver fluid, a second axial piston hydraulic unit adapted to receive and deliver fluid, each of said hydraulic units including a rotatable cylinder block, cam means for reciprocating pistons therein and a housing surrounding the block and cam means, and a valve plate having two arcuate ports therein mounted between said first and second hydraulic units adapted to deliver fluid from the first hydraulic unit to the second hydraulic unit and return fluid from the second hydraulic unit to the first hydraulic unit in closed circuit fashion, said cylinder blocks both slidably engaging said valve plate, said first and second hydraulic units being in back-to-back relation, having a common axis of rotation and being fixed together with said valve plate as a unit; a base member surrounding and supporting said cartridge, said base member being constructed to permit the insertion of said cartridge as a unit without the disassembly of the cartridge or base member, and means for releasably attaching said cartridge to said base member whereby the cartridge may be inserted as a unit in the base.

3. A hydrostatic transmission assembly, comprising: a hydraulic transmission cartridge including a first axial piston hydraulic unit adapted to receive and deliver fluid, a second axial piston hydraulic unit adapted to receive and deliver fluid, each of said hydraulic units including a rotatable cylinder block, cam means for reciprocating pistons therein and a housing surrounding the block and cam means, and a valve plate having two arcuate ports therein mounted between said first and second hydraulic units and adapted to deliver fluid from the first hydraulic unit to the second hydraulic unit and return fluid from the second hydraulic unit to the first hydraulic unit in closed circuit fashion, said cylinder blocks both slidably engaging said valve plate, said first and second hydraulic units being in back-to-back relation, having a common axis of rotation and being fixed together with said valve plate as a unit; a base member surrounding and supporting said cartridge, said base member being constructed to permit the insertion of said cartridge as a unit without the disassembly of the cartridge or base member, means for attaching said cartridge to said base member, whereby the cartridge may be inserted as a unit in the base member, and motor means fixed to said base member for driving said first axial piston hydraulic unit, said motor means having an axis of rotation parallel to said first and second hydraulic units.

4. A hydrostatic transmission assembly, comprising: a hydraulic transmission cartridge member including a first axial piston hydraulic unit adapted to receive and deliver fluid, a second axial piston hydraulic unit adapted to receive and deliver fluid, a valve plate having two arcuate ports therein mounted between said first and second hydraulic units and adapted to deliver fluid from said first hydraulic unit to said second hydraulic unit and to return fluid from said second hydraulic unit to said first hydraulic unit in closed circuit fashion, said first and second hydraulic units being in back-to-back relation and having a common axis of rotation; a base member surrounding and supporting said cartridge, means for attaching said cartridge to said base member whereby the cartridge may be inserted as a unit in the base member, a motor mounted on said base member and adapted to drive said first hydraulic unit, said motor having an axis of rotation parallel to the axis of rotation of said first and second hydraulic units, belt means connected between said motor and said first hydraulic unit to transfer driving force therebetween, and a reservoir mounted on one of said members and connected to deliver fluid to said first hydraulic unit, said reservoir being mounted within said belt to provide a compact assembly.

5. A hydrostatic transmission assembly, comprising: a hydraulic transmission cartridge including a first axial piston hydraulic unit adapted to receive and deliver fluid, a second axial piston hydraulic unit adapted to receive and deliver fluid, a valve plate having ports therein communicating with said first and second hydraulic units, said first and second hydraulic units being in back-to-back relation and having a common axis of rotation; a base member surrounding and supporting said cartridge; means for selectively attaching said cartridge to said base member whereby the cartridge may be inserted as a unit in the base; and means for varying the displacement of the first hydraulic unit including manual handle means threaded into said base for varying the displacement of the first hydraulic unit, normally rigid resilient means connecting said handle means and said first hydraulic unit and adapted to yield when excessive pressure is produced in the hydraulic units.

6. A hydrostatic transmission assembly, comprising: a hydraulic cartridge including a first axial piston hydraulic unit adapted to receive and deliver fluid, a second axial piston hydraulic unit adapted to receive and deliver fluid, a valve plate having two arcuate ports therein mounted between and fixed to said first and second hydraulic units and adapted to deliver fluid from said first hydraulic unit to said second hydraulic unit and return fluid from said second hydraulic unit to said first hydraulic unit in closed circuit fashion, said first and second hydraulic units being in back-to-back relation and having a common axis of rotation; a base member surrounding and supporting said cartridge, said base member being generally rectangular in shape and including a bottom wall, side walls, and a top wall connected together, lug means on said walls extending inwardly therefrom and defining a mounting surface, and means for selectively attaching said valve plate to said mounting surface whereby the cartridge is supported on the base.

7. A hydrostatic transmission assembly as defined in claim 6 wherein said lug means includes a lug extending from the junctures of the bottom, side and top walls, said lugs each having a mounting surface with said mounting surfaces lying in a common plane, said valve plate being generally rectangular in shape, said means for attaching the valve plate to the mounting surface including fasteners extending through the valve plate adjacent each of the junctures, each being fixed to one of the respective lugs.

8. A hydrostatic transmission assembly, comprising: a hydraulic cartridge including a first axial piston hydraulic unit adapted to receive and deliver fluid, a housing member surrounding said first axial piston hydraulic unit, a cam member pivotally mounted in said housing for varying the displacement of the first hydraulic unit, linkage means connected to said cam member and extending from said housing so that the displacement of the first hydraulic unit may be externally varied, a second axial piston hydraulic unit adapted to receive and deliver fluid, a valve plate having ports therein communicating with said first and second hydraulic units, said first and second hydraulic units being in back-to-back relation fixed to said valve plate and having a common axis of rotation; a base member surrounding and supporting said cartridge, said base member having a cut-out portion extending from one end thereof to receive said linkage extending from the first hydraulic unit housing, and means for attaching said cartridge to said base member whereby the cartridge may be inserted as a unit in the base member.

9. A hydrostatic transmission assembly as defined in claim 8 and further including a projection on said base member adjacent said cut-out portion, a manual displacement control handle threaded into said projection and extending parallel to the axis of rotation of said first and second hydraulic units, and means connecting said handle to said linkage.

10. A hydrostatic transmission assembly, comprising: a hydraulic transmission cartridge including an axial piston pump, an input shaft for driving said axial piston pump, an integral finned housing member surrounding said pump, said pump having an adjustable cam member pivotally mounted in said housing for varying the displacement of said pump, an axial piston hydraulic motor, an output shaft connected to be driven by said hydraulic motor, an integral finned housing member enclosing said motor, a valve plate fixed between and to said pump and motor housings so that the pump and motor rotate about a common axis, said valve plate having two arcuate ports therein adapted to selectively deliver high and low pressure fluid between the pump and the motor in closed circuit fashion, bearing means in said valve plate receiving said input and output shafts; a generally rectangular base having a bottom wall, side walls and a top wall connected together, a plurality of lugs extending from said walls in a common plane, means releasably connecting said valve plate to said lugs whereby the cartridge may be inserted into said base, manual handle means threaded into said base for varying the angle of said swashplate, normally rigid resilient means connecting said handle means and said swashplate and adapted to yield when excessive pressure is produced in the hydraulic circuit, an electric motor fixed to said top wall of said base, said electric motor having a drive shaft rotatable about an axis parallel to said input and output shafts, pulley and belt means interconnecting said drive shaft and said input shaft so that the electric motor drives the pump, and shroud means surrounding said pulley and belt means, said shroud means being fixed to said base.

11. A hydrostatic transmission assembly, comprising: a hydraulic transmission cartridge including an axial piston pump, an input shaft for driving said axial piston pump, an integral finned housing member surrounding said pump, said pump having an adjustable cam member pivotally mounted in said housing for varying the displacement of said pump, an axial piston hydraulic motor, an output shaft connected to be driven by said hydraulic motor, an integral finned housing member enclosing said motor, a valve plate fixed between and to said pump and motor housings so that the pump and motor rotate about a common axis, said valve plate having two arcuate ports therein adapted to selectively deliver high and low pressure fluid between the pump and the motor in closed circuit fashion, bearing means in said valve plate receiving said input and output shafts, a charge pump for withdrawing fluid from said pump housing and supplying make-up and cooling fluid to said circuit, valve means in said valve plate for selectively porting fluid from said charge pump to one of said arcuate ports, and a reservoir fixed to said pump housing for supplying fluid thereto; a generally rectangular base having a bottom wall, side walls and a top wall connected together, a plurality of lugs extending from said side walls and having mounting surfaces in a common plane, means releasably connecting said valve plate to said lugs whereby the cartridge may be inserted into said base, an electric motor fixed to said top wall of said base, said electric motor having a drive shaft rotatable about an axis parallel to said input and output shafts, pulley and belt means interconnecting said drive shaft and said input shaft so that the electric motor drives the pump, and shroud means surrounding said pulley and belt means and said reservoir, said shroud means being fixed to said base.

12. A hydrostatic transmission assembly, comprising: a hydraulic transmission cartridge including an axial piston pump, an input shaft for driving said axial piston pump, an integral finned housing member surrounding said pump, said pump having an adjustable cam member pivotally mounted in said housing for varying the displacement of said pump, linkage means extending externally of said housing and connected to said cam member, for rotation thereof, an axial piston hydraulic motor, an output shaft connected to be driven by said hydraulic motor, an integral finned housing member enclosing said motor, a valve plate fixed between and to said pump and motor housings so that the pump and motor rotate about a common axis, said valve plate having two arcuate ports therein adapted to selectively deliver high and low pressure fluid between the pump and motor in closed circuit fashion, bearing means in said valve plate receiving and mounting said input and output shafts therein, a charge pump for withdrawing fluid from said pump housing and supplying make-up and cooling fluid to said circuit, valve means in said valve plate for selectively porting fluid from said charge pump to one of said arcuate ports, and a reservoir fixed to said pump housing for supplying fluid thereto; a generally rectangular base surrounding said cartridge and having a bottom wall, side walls and a top wall connected together, one of said side walls having a cut-out portion extending from the end thereof for receiving said pump linkage means, a plurality of lugs extending from said walls in a common plane, means releasably connecting said valve plate to said lugs whereby the cartridge may be inserted into said base; manual handle means threaded into said base for varying the angle of said cam member, normally rigid resilient means connecting said handle means and said linkage and adapted to yield when excessive pressure is produced in the hydraulic circuit, an electric motor fixed to said top wall of said base, said electric motor having a drive shaft rotatable about an axis parallel to said input and output shafts, pulley and belt means interconnecting said drive shaft and input shaft so that the electric motor drives the pump, and shroud means surrounding said pulley and belt means and said reservoir, said shroud means being fixed to said base.

References Cited by the Examiner

UNITED STATES PATENTS

| | | | |
|---|---|---|---|
| 1,197,789 | 9/1916 | Blumel | 60—53 X |
| 1,993,612 | 3/1935 | Lum | 60—52 X |
| 2,605,613 | 8/1952 | Grebe | 60—52 |
| 3,133,418 | 5/1964 | Froebe | 60—53 |
| 3,175,365 | 3/1965 | Allgaier et al. | 60—53 |

FOREIGN PATENTS 868,997   3/1953   Germany.

EDGAR W. GEOGHEGAN, *Primary Examiner.*